(12) United States Patent
Takesue et al.

(10) Patent No.: US 6,822,028 B2
(45) Date of Patent: Nov. 23, 2004

(54) GOLF BALL MATERIAL AND GOLF BALL

(75) Inventors: Rinya Takesue, Chichibu (JP); Yasushi Ichikawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/206,204

(22) Filed: Jul. 29, 2002

(65) Prior Publication Data

US 2003/0045652 A1 Mar. 6, 2003

(30) Foreign Application Priority Data

Aug. 8, 2001 (JP) ........................................ 2001-240731

(51) Int. Cl.[7] .......................... A63B 37/12; C08K 5/17; C08L 33/02
(52) U.S. Cl. ........................ 524/251; 524/252; 525/127; 525/130; 473/378; 473/385
(58) Field of Search ................................. 524/251, 252; 525/127, 130; 473/378, 385

(56) References Cited

U.S. PATENT DOCUMENTS

| | | | |
|---|---|---|---|
| 3,395,109 A | 7/1968 | Molitor et al. | |
| 3,646,158 A | * 2/1972 | Eustice | 428/220 |
| 4,248,432 A | 2/1981 | Hewitt et al. | |
| 4,442,282 A | 4/1984 | Kolycheck | |
| 4,674,751 A | 6/1987 | Molitor et al. | |
| 4,757,102 A | * 7/1988 | Ravichandran et al. | 524/95 |
| 5,356,976 A | * 10/1994 | Dubs et al. | 524/348 |
| 5,919,862 A | * 7/1999 | Rajagopalan | 525/63 |
| 5,929,189 A | * 7/1999 | Ichikawa et al. | 528/76 |
| 6,037,419 A | * 3/2000 | Takesue et al. | 525/329.9 |

FOREIGN PATENT DOCUMENTS

| | | | |
|---|---|---|---|
| EP | 895791 | * | 2/1999 |
| WO | WO 00/23519 | * | 4/2000 |

* cited by examiner

Primary Examiner—David J. Buttner
(74) Attorney, Agent, or Firm—Sughrue Mion, PLLC

(57) ABSTRACT

A material comprising a heated mixture of (A) an olefin-unsaturated carboxylic acid copolymer, an olefin-unsaturated carboxylic acid-unsaturated carboxylate copolymer, a metal ion neutralized product thereof, or a mixture thereof, (B) a polyurethane elastomer, and (C) an organic or inorganic basic compound has improved thermal stability, flow and moldability. Using the material, golf balls having good rebound are effectively manufactured.

6 Claims, No Drawings

GOLF BALL MATERIAL AND GOLF BALL

The present invention relates to golf ball materials based on polyurethane/ionomer resin blends which have good heat resistance, moldability and film adhesion and which are capable of providing high-performance golf balls endowed with outstanding rebound energy and a good feel. The invention relates also to golf balls made with such golf ball materials.

BACKGROUND OF THE INVENTION

In the past, wide use was made of ionomer resins in golf ball cover materials, also referred to hereinafter as "cover stock". Ionomer resins are ionic copolymers composed of an olefin such as ethylene in combination with a metal salt of an unsaturated carboxylic acid such as acrylic acid, methacrylic acid or maleic acid. Specifically the acidic groups are partially neutralized with metal ions such as sodium or zinc ions. These resins have excellent characteristics such as durability and resilience and are suited as the base resin in the golf ball cover stock.

Golf ball cover stocks based on ionomer resins are generally very hard and lack a sufficient flexibility to impart a spin rate necessary to control the ball in flight. Also golf balls using such hard ionomer resins as the cover stock lack a "feel" when hit.

To overcome the drawbacks of ionomer resins, cover stocks using thermoplastic polyurethane elastomers were proposed as disclosed in U.S. Pat. Nos. 3,395,109, 4,248,432, and 4,442,282. The cover stocks using thermoplastic polyurethane elastomers are improved in feel and ball controllability over the cover stocks using ionomer resins.

Recently, the cover stock which found a good compromise between the resilience of ionomer resin-base cover stocks and the feel of polyurethane elastomer-base cover stocks was proposed in U.S. Pat. No. 4,674,751 as comprising a blend of an ionomer resin with a polyurethane elastomer.

However, the ionomer resin and the polyurethane elastomer have such properties that they form chemical bonds when heat mixed. When the cover stock composition is kept heated, it gels to inhibit subsequent molding, which is impractical.

SUMMARY OF THE INVENTION

Therefore, one object of the invention is to provide golf ball materials based on polyurethane/ionomer resin blends which have good heat resistance, moldability and film adhesion and which are capable of providing golf balls endowed with outstanding rebound energy and a good feel. Another object of the invention is to provide golf balls made using such golf ball materials.

It has been found that the addition of organic or inorganic basic compounds to polyurethane/ionomer resin blends is effective for preventing the polyurethane/ionomer resin blends from gelling when kept hot. The material thus obtained does not gel upon molding, and a golf ball manufactured using the material is endowed with good rebound energy.

The present invention provides a golf ball material comprising a heated mixture of (A) an olefin-unsaturated carboxylic acid copolymer, an olefin-unsaturated carboxylic acid-unsaturated carboxylate copolymer, a metal ion neutralized product thereof, or a mixture thereof, (B) a polyurethane elastomer, and (C) an organic or inorganic basic compound.

Preferably, a weight ratio of components (A):(B):(C) is 50–99.9:0.1–50:0.1–20, alternatively, a weight ratio of components (A):(B):(C) is 0.1–50:50–99.9:0.1–20. The polyurethane elastomer (B) is typically a thermoplastic polyurethane elastomer or a polyurethane powder. The organic or inorganic basic compound (C) is preferably selected from among an amine, amide, imine, nitrile, phenol, thiol, alcohol, inorganic metal compound and metal soap.

Also contemplated herein is a solid golf ball comprising a solid core and a cover including one or more layers wherein at least one layer of the cover is formed of the golf ball material defined above.

DESCRIPTION OF THE PREFERRED EMBODIMENTS

Component (A) in the golf ball material of the present invention is an olefin-unsaturated carboxylic acid copolymer, a metal ion neutralized product of olefin-unsaturated carboxylic acid copolymer, an olefin-unsaturated carboxylic acid-unsaturated carboxylate copolymer, a metal ion neutralized product of olefin-unsaturated carboxylic acid-unsaturated carboxylate copolymer, or a mixture of any.

The olefin generally has at least 2 carbon atoms, but not more than 8 carbon atoms, and preferably not more than 6 carbon atoms. Illustrative examples include ethylene, propylene, butene, pentene, hexene, heptene and octene. Ethylene is especially preferred.

Suitable examples of the unsaturated carboxylic acid include acrylic acid, methacrylic acid, maleic acid and fumaric acid. Of these, acrylic acid and methacrylic acid are especially preferred.

The unsaturated carboxylate is preferably a lower alkyl ester of the foregoing unsaturated carboxylic acid. Illustrative examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The copolymer (A) may be prepared by furnishing the above ingredients and carrying out random copolymerization in a well-known manner.

It is recommended that the unsaturated carboxylic acid content (simply referred to as acid content) within the olefin-unsaturated carboxylic acid copolymer be at least 4%, preferably at least 6%, more preferably at least 8%, and most preferably at least 10% by weight, but not more than 30%, preferably not more than 20%, more preferably not more than 18%, and most preferably not more than 15% by weight. Outside the range, a lower acid content may lower resilience whereas a higher acid content may lower processability. For the olefin-unsaturated carboxylic acid-unsaturated carboxylate copolymer, an appropriate acid content is at least 4%, preferably at least 6%, and more preferably at least 8% by weight, but not more than 15%, preferably not more than 12%, and more preferably not more than 10% by weight. Outside the range, a lower acid content may lower resilience whereas a higher acid content may lower processability.

The metal ion-neutralized product of the copolymer may be prepared by partially neutralizing acid groups in the above-mentioned olefin-unsaturated carboxylic acid(-unsaturated carboxylate) copolymer with metal ions.

Examples of the metal ions for neutralizing acid groups include $Na^+$, $K^+$, $Li^+$, $Zn^{2+}$, $Cu^{2+}$, $Mg^{2+}$, $Ca^{2+}$, $Co^{2+}$, $Ni^{2+}$ and $Pb^{2+}$. The use of ions such as $Na^+$, $Li^+$, $Zn^{2+}$, $Mg^{2+}$ and $Ca^{2+}$ is preferred. The degree of neutralization of the copolymers with metal ions is not critical. The neutralized products may be obtained by any well-known method. For example, the copolymers can be neutralized using formates, acetates, nitrates, carbonates, hydrogencarbonates, oxides, hydroxides or alkoxides of the metal ions.

The copolymers and neutralized products thereof serving as component (A) are available in the marketplace. The olefin-unsaturated carboxylic acid copolymer is commercially available, for example, under the trade name of Nucrel 1560, 1214 and 1035 from DuPont-Mitsui Polychemicals Co., Ltd. and ESCOR 5200, 5100 and 5000 from EXXONMOBIL Chemical. The olefin-unsaturated carboxylic acid-unsaturated carboxylate copolymer is commercially available, for example, under the trade name of Nucrel AN4311 and AN4318 from DuPont-Mitsui Polychemicals Co., Ltd. and ESCOR ATX325, ATX320 and ATX310 from EXXONMOBIL Chemical. Also the metal-neutralized olefin-unsaturated carboxylic acid copolymer is commercially available, for example, under the trade name of Himilan 1554, 1557, 1601, 1605, 1706 and AM7311 from DuPont-Mitsui Polychemicals Co., Ltd., and Surlyn 7930 from E. I. Dupont. The metal-neutralized olefin-unsaturated carboxylic acid-unsaturated carboxylate copolymer is commercially available, for example, under the trade name of Himilan 1855, 1856, and AM7316 from DuPont-Mitsui Polychemicals Co., Ltd., Surlyn 6320, 8320, 9320 and 8120 from E. I. Dupont, and Iotek 7510 and 7520 from EXXONMOBIL Chemical.

In the practice of the invention, the neutralized or non-neutralized olefin-unsaturated carboxylic acid(-unsaturated carboxylate) copolymers may be used alone or in admixture of two or more. An appropriate blend ratio of the (neutralized) olefin-unsaturated carboxylic acid copolymer to the (neutralized) olefin-unsaturated carboxylic acid-unsaturated carboxylate copolymer is from 100:0 to 25:75, preferably from 100:0 to 50:50, more preferably from 100:0 to 75:25, and most preferably 100:0 in parts by weight. If the blend ratio of the (neutralized) olefin-unsaturated carboxylic acid copolymer is less than 25 parts by weight, the material may be less resilient.

When the olefin-unsaturated carboxylic acid(-unsaturated carboxylate) copolymer is used in admixture with the metal ion-neutralized product thereof, an appropriate blend ratio is generally from 0:100 to 60:40, preferably from 0:100 to 40:60, more preferably from 0:100 to 20:80, and most preferably 0:100 in parts by weight, though not limited thereto. If the blend ratio of the olefin-unsaturated carboxylic acid(-unsaturated carboxylate) copolymer is more than 60 parts by weight, the material as mixed may be poorly moldable.

It is noted that the aforementioned olefin-unsaturated carboxylic acid copolymer and olefin-unsaturated carboxylic acid-unsaturated carboxylate copolymer, both of which may be neutralized, are sometimes generally referred to as base resin.

Component (B) is a polyurethane elastomer. It is not critical although it is preferably selected from a thermoplastic polyurethane elastomer, polyurethane powder, and thermosetting polyurethane elastomer. Of these, the thermoplastic polyurethane elastomer and polyurethane powder are more preferred.

The thermoplastic polyurethane elastomer used herein preferably has a molecular structure including soft segments of a high molecular weight polyol, hard segments constructed of a monomolecular chain extender, and a diisocyanate.

The high molecular weight polyol compound is not critical and may be any of polyester polyols, polyol polyols, polyether polyols, copolyester polyols, and polycarbonate polyols. The polyester polyols include polycaprolactone glycol, poly(ethylene-1,4-adipate) glycol, and poly (butylene-1,4-adipate) glycol. Typical of the copolyester polyols is poly(diethylene glycol adipate) glycol. One exemplary polycarbonate polyol is hexane diol-1,6-carbonate glycol. Polyoxytetramethylene glycol is typical of the polyether polyols. These polyols have a number average molecular weight of about 600 to 5,000, preferably about 1,000 to 3,000.

The diisocyanates used herein are often aliphatic or aromatic diisocyanates. Examples include hexamethylene diisocyanate (HDI), 2,2,4- or 2,4,4-trimethylhexamethylene diisocyanate (TMDI), lysine diisocyanate (LDI), tolylene diisocyanate (TDI), and diphenylmethane diisocyanate (MDI). Of these, hexamethylene diisocyanate (HDI) and diphenylmethane diisocyanate (MDI) are preferred for compatibility with other resins to be blended therewith.

The chain extender used herein is not critical and may be any of commonly used polyhydric alcohols and amines. Examples include 1,4-butylene glycol, 1,2-ethylene glycol, 1,3-propylene glycol, 1,6-hexylene glycol, 1,3-butylene glycol, dicyclohexylmethane diamine (hydrogenated MDI), and isophorone diamine (IPDA).

The thermoplastic polyurethane elastomer should preferably have a JIS A hardness of 70 to 100, preferably 80 to 99, more preferably 90 to 99, and especially 95 to 98. With a JIS A hardness of less than 70, the spin rate on driver shots may increase in excess, leading to a reduction of distance. The specific gravity of the thermoplastic polyurethane elastomer is not critical and may be suitably adjusted as long as the objects of the invention is achievable. The specific gravity is preferably 1.0 to 1.3, and more preferably 1.1 to 1.25.

Suitable thermoplastic polyurethane elastomers are commercially available under the trade name of Pandex T7298, EX7895, T7890 and T8198 from DIC-Bayer Polymer Co., Ltd.

The polyurethane powder used herein is, for example, spherical fine particles of polyurethane polymer. Such spherical polymer particles do not agglomerate together and are readily dispersed in the base ionomer resin so that inherent properties of urethane such as flexibility, toughness, mar resistance and freeze resistance can be imparted to the cover stock without compromising the physical properties of the cover stock. Additionally, spherical polymer particles serve to improve moldability because of good flowability and lubricity. The spherical polymer particles generally have an average particle size of 0.1 to 100 μm, preferably 0.5 to 60 μm, more preferably 1 to 40 μm, most preferably 2 to 20 μm. Such spherical polymer particles are commercially available as Art Pearl series from Negami Industry Co., Ltd.

In the practice of the invention, the base resin (A) and the polyurethane elastomer (B) are blended in amounts of 50-99.9 parts and 50-0.1 parts by weight, preferably 80-99.5 parts and 20-0.5 parts by weight, more preferably 85-99 parts and 15-1 parts by weight, and even more preferably 88-97 parts and 12-3 parts by weight, respectively, when resilience is of greater interest. If the amount of component (B) blended is more than 50 parts by weight, resilience may be low. If the amount of component (B) blended is less than 0.1 part by weight, the desired effects of blending that component may be lost. When this blend is applied to a cover stock, the cover stock has a Shore D hardness of 45 to 75, preferably 50 to 75, more preferably 55 to 65, even more preferably 58 to 62.

When the feel on hit is of greater interest, on the other hand, the base resin (A) and the polyurethane elastomer (B) are blended in amounts of 0.1–50 parts and 99.9–50 parts by weight, preferably 0.5–20 parts and 99.5–80 parts by weight, more preferably 1–15 parts and 99–85 parts by weight, and even more preferably 3–12 parts and 97–88 parts by weight, respectively. If the amount of base resin (A) blended is more than 50 parts by weight, the feel may become poor. If the amount of base resin (A) blended is less than 0.1 part by weight, the desired effects of blending that component may be lost. When this blend is applied to a cover stock, the cover stock has a Shore D hardness of 30 to 60, preferably 35 to 55, more preferably 40 to 50, even more preferably 43 to 47.

Component (C) is an organic or inorganic basic compound. It is selected from among amines, amides, imines, nitrites, phenols, thiols, alcohols, inorganic metal compounds and metal soaps. Of these, amines are preferred, with aliphatic primary amines being most preferred. These aliphatic primary amines are not only effective for alleviating gelation reaction, but also serve as a lubricant due to alkyl groups included therein, thus achieving a significant improvement in molding.

Such aliphatic amines are available in the marketplace, for example, as Nissan Amine series from NOF Co., Ltd.

An appropriate amount of the organic or inorganic basic compound blended is 0.1 to 20 parts, preferably 0.5 to 10 parts, more preferably 1 to 8 parts, even more preferably 2 to 6 parts by weight, per 100 parts by weight of the base resin (A) and the polyurethane elastomer (B) combined. On this basis, more than 20 parts of the basic compound may lead to a decline of resilience whereas less than 0.1 part of the basic compound may be less effective for preventing gelation.

In addition to the essential components, various thermoplastic elastomers may be blended in the material composition of the invention for the purpose of improving the feel of the ball when hit. Suitable thermoplastic elastomers include olefinic elastomers, styrenic elastomers, polyester elastomers, and polyamide elastomers. Of these, olefinic elastomers and polyester elastomers are preferred, with the olefinic elastomers being most preferred.

If the thermoplastic elastomer is added, an appropriate amount thereof is 1 to 100 parts, preferably 2 to 60 parts, more preferably 3 to 40 parts, even more preferably 4 to 20 parts by weight, per 100 parts by weight of the base resin (A) and the polyurethane elastomer (B) combined.

The golf ball material of the invention should preferably have a melt index of 0.5 to 30 dg/min, more preferably 1.0 to 10 dg/min, even more preferably 1.5 to 5 dg/min.

Any desired method may be used for preparing the material of the invention. For instance, when the inventive material is prepared for use as cover stock in the manufacture of golf balls, heating is typically carried out at a temperature of 150 to 250° C. and blending is typically carried out using an internal mixer such as a kneading-type twin-screw extruder, a Banbury mixer or a kneader. Any suitable method may be used, without particular limitation, to incorporate various additives together with the essential components in the golf ball material of the invention. For example, the additives may be blended with the essential components, and heating and mixing of all the ingredients carried out at the same time. Alternatively, the essential components may be previously heated and mixed, following which the optional additives may be added and the overall composition subjected to additional heating and mixing.

The golf balls of the invention are golf balls which have been produced using a golf ball material according to the invention. The layer or layers made of the golf ball material may constitute part or all of the golf ball. The inventive golf balls may be thread-wound balls, including those in which the cover has a single-layer or a multiple-layer construction, one-piece balls, two-piece balls, three-piece balls, or multi-piece balls having a cover composed of three or more layers.

The inventive golf balls may be manufactured by preparing various heated mixtures for making one-piece balls, the solid centers of thread-wound golf balls, the solid cores or covers (for at least one layer in cores and covers composed of two or more layers) of solid golf balls in accordance with the above-described golf ball material formulation of the invention, then using the heated mixture in accordance with a golf ball manufacturing method known to the art.

When the cover of a golf ball according to the invention is made of the golf ball material according to the present invention, the core may be a thread-wound core or a solid core and may be produced by a conventional method. For example, a solid core may be produced by preparing a rubber composition composed of 100 parts by weight of cis-1,4-polybutadiene; from 10 to 60 parts by weight of one or more vulcanizing or crosslinking agents selected from among $\alpha,\beta$-monoethylenically unsaturated carboxylic acids (e.g., acrylic acid, methacrylic acid) or metal ion-neutralized compounds thereof and functional monomers (e.g., trimethylolpropane methacrylate); from 5 to 30 parts by weight of a filler such as zinc oxide or barium sulfate; from 0.5 to 5 parts by weight of a peroxide such as dicumyl peroxide; and, if necessary, from 0.1 to 1 part by weight of an antioxidant. The resulting rubber composition can be formed into a solid spherical core by press vulcanization to effect crosslinkage, followed by compression under heating at 140 to 170° C. for a period of 10 to 40 minutes.

For thread-wound golf balls, production of a thread-wound core may be carried out using either a liquid or a solid center. In the case of a liquid center, a hollow spherical center envelope may be formed from the above-described rubber composition, for example, and a liquid filled into this envelope by a well-known method. If a solid center is used instead, the solid center may be produced by the solid core production method described above. Thereafter, rubber thread is wound in a stretched state about the center to form the core.

Use may be made of rubber thread produced by a conventional method. For example, a rubber composition is prepared by compounding natural rubber or synthetic rubber such as polyisoprene with various additives (e.g., antioxidants, vulcanization accelerators and sulfur), extruded and vulcanized.

The golf balls using the various types of cores described above and falling within the scope of the invention can be produced by forming the cover from the inventive golf ball material. In one such method, a monolithic or multi-layer core prefabricated according to the type of ball to be manufactured is placed in a mold, and the inventive material is heated, mixed and melted, then injection-molded over the core. In this case, the golf ball manufacturing operation can be carried out under conditions which assure that the material maintain excellent thermal stability, flow characteristics and moldability. The resulting golf ball has a high rebound.

The method used to produce the cover is not limited to the method described above. For example, use may be made of a method in which first a pair of hemispherical cups is molded from the inventive golf ball material, following which the cups are placed over a core and molded under heat and pressure at 120 to 170° C. for 1 to 5 minutes.

No particular limitation is imposed on the thickness of the cover made of the inventive material, although the cover is generally formed to a thickness of at least 0.5 mm, preferably at least 0.9 mm, and more preferably at least 1.1 mm, but not more than 3 mm, preferably not more than 2.5 mm, and more preferably not more than 2.0 mm. The cover in the golf balls of the invention is not limited to one layer, and may instead have a multilayer construction of two or more layers. If the cover has a multilayer construction, the golf ball material of the invention may be used either at the interior of the multilayer construction or as the outermost layer of the cover. If the inventive gold ball has a single-layer cover, it is highly advantageous for the inventive material to serve as the cover material. If the ball has a cover of two or more layers, the inventive material is most preferably used as a layer of the cover other than the outermost layer—that is, as an inner layer of the cover.

The cover formed of the inventive material may have any desired specific gravity although it is generally advisable for the specific gravity to be at least 0.9, preferably at least 0.92, more preferably at least 0.94, but not more than 1.2, preferably not more than 1.10 and more preferably not more than 1.05.

The surface of the outermost layer of the cover may have a plurality of dimples formed thereon, and the cover may be administered various treatment such as surface preparation, stamping and painting. In particular, the ease of work involved in administering such surface treatment to a golf ball cover made of the inventive material can be improved by the good processability of the cover surface.

In the golf balls manufactured as described above, the diameter, weight, hardness and other parameters of the cover, solid or liquid center, solid core or thread-wound core, and one-piece golf balls, while not subject to any particular limitations, may be adjusted as appropriate, insofar as the objects of the invention are attainable.

The golf ball of the invention may be a golf ball in which the inventive golf ball material has been used other than as the cover stock described above. For example, it may be a golf ball arrived at by using the inventive material as a one-piece golf ball material or as a core material, in which case production may be carried out by injection-molding the material.

The golf ball of the invention may be manufactured for use in tournaments by giving it a diameter and weight which conform with the Rules of Golf. That is, the ball may be produced to a diameter of at least 42.67 mm and a weight of not more than 45.93 g.

The golf ball material of the invention including a polyurethane/ionomer resin blend has good thermal stability, flow characteristics and moldability. The golf balls of the invention, which are arrived at by making use of the inventive golf ball material, can be manufactured easily and efficiently, and have excellent rebound.

EXAMPLE

Examples of the invention and comparative examples are given below by way of illustration, and are not intended to limit the invention.

Examples 1–6 and Comparative Examples 1–7

Using a core material composed primarily of cis-1,4-polybutadiene, a solid core A having a diameter of 38.6 mm, a weight of 35.2 g, and a deflection of 2.9 mm under a load of 100 kg and a solid core B having a diameter of 38.6 mm, a weight of 33.5 g, and a deflection of 2.9 mm under a load of 100 kg were produced.

Cover materials of the compositions shown in Tables 1 and 2 were mixed at 200° C. with a kneading-type twin-screw extruder and prepared in the form of pellets. In each of the examples, the cover material was injected into a mold in which the solid core prepared above had been placed, giving a two-piece solid golf ball. Using an automatic spray gun, a urethane base paint was sprayed to a coat thickness of 15 μm. After painting, the ball was heat dried at 60° C. for 2 hours and allowed to stand at room temperature for 16 hours. The resulting two-piece solid golf ball had a diameter of 42.8 mm and a cover thickness of 2.1 mm.

The following characteristics were measured or evaluated for the golf balls obtained in each Example. The results are shown in Tables 1 and 2.
Gelation:
The cover material was milled at 230° C. and 20 rpm for 60 minutes in a Labo Plasto mill, and examined whether or not it gelled.
  o: not gelled
  X: gelled
Ball Hardness:
Measured as the deflection (in millimeters) of the ball under a load of 100 kg.
Initial Velocity:
Measured using the same type of initial velocity instrument as that used by the USGA, and in accordance with USGA rules.

Melt Index:
The melt index of the material was measured in accordance with JIS-K7210 at a temperature of 190° C. and under a load of 21 N (2.16 kgf).
Sand Abrasion Test:
The painted golf balls were placed in a magnetic ball mill having an interior volume of 8 liters together with 3 liters of bunker sand. The mill was operated for 2 hours. Evaluation was made by visually observing flaw, luster loss, and deposition of sand on the golf ball paint coat surface.
  ⊚: very slight
  o: some
  Δ: noticeable
  X: highly noticeable
Durability:
Using a COR instrument, the golf ball was repetitively struck at an injection speed of 50 m/s. The number of strikes until the ball failed was counted.

Trade names and materials mentioned in the tables are described below.
Himilan 1605: sodium ion-neutralized ethylene-methacrylic acid copolymer by DuPont-Mitsui Polychemicals Co., Ltd.
Himilan 1706: zinc ion-neutralized ethylene-methacrylic acid copolymer by DuPont-Mitsui Polychemicals Co., Ltd.
Himilan 1601: sodium ion-neutralized ethylene-methacrylic acid copolymer by DuPont-Mitsui Polychemicals Co., Ltd.
Himilan 1557: zinc ion-neutralized ethylene-methacrylic acid copolymer by DuPont-Mitsui Polychemicals Co., Ltd.
Pandex T7298: thermoplastic polyurethane elastomer by DIC Bayer Polymer Co., Ltd., JIS A hardness 98
Art Pearl C-400: spherical polymer particles by Negami Industry Co., Ltd., average particle size 14.9 μm
Amine ABT: hardened beef tallow alkyl amine by NOF Corp.
Amine DTH: hardened beef tallow alkyl propylene diamine by NOF Corp.

TABLE 1

| | | Example | | | | | |
|---|---|---|---|---|---|---|---|
| | | 1 | 2 | 3 | 4 | 5 | 6 |
| Core | | A | A | A | A | A | B |
| Cover stock composition (pbw) | Himilan 1605 | 47.5 | 45 | | 47.5 | 47.5 | 5 |
| | Himilan 1706 | 47.5 | 45 | | 47.5 | 47.5 | 5 |
| | Himilan 1601 | | | 45 | | | |
| | Himilan 1557 | | | 45 | | | |
| | Pandex T7298 | 5 | 10 | 10 | | 5 | 90 |
| | Art Pearl C-400 | | | | 5 | | |
| | Amine ABT | 3 | 3 | 3 | 3 | | 3 |
| | Amine DTH | | | | | 3 | |
| | Polyethylene wax | 0.5 | 0.5 | 0.5 | 0.5 | 0.5 | 0.5 |
| | Titanium dioxide | 2 | 2 | 2 | 2 | 2 | 2 |
| Resin physical properties | Gelation | o | o | o | o | o | o |
| | MI (g/10 min) | 3.0 | 3.3 | 3.7 | 2.6 | 2.3 | 16.0 |
| | Specific gravity | 0.98 | 0.99 | 0.98 | 0.98 | 0.98 | 1.14 |
| | Cover hardness (Shore D) | 61 | 60 | 58 | 61 | 61 | 50 |
| Ball physical properties | Hardness (mm) | 2.5 | 2.5 | 2.6 | 2.5 | 2.5 | 2.7 |
| | Weight (g) | 45.1 | 45.2 | 45.1 | 45.1 | 45.1 | 45.0 |
| | Sand abrasion test | ⊚ | ⊚ | ⊚ | ⊚ | ⊚ | ⊚ |
| | Initial velocity (m/s) | 77.2 | 77.1 | 77.0 | 77.2 | 77.2 | 76.6 |
| | Durability | 164 | 191 | 300< | 162 | 172 | 300< |

TABLE 2

|  |  | Comparative Example | | | | | | |
| --- | --- | --- | --- | --- | --- | --- | --- | --- |
|  |  | 1 | 2 | 3 | 4 | 5 | 6 | 7 |
| Core |  | A | A | A | A | A | B | B |
| Cover stock composition (pbw) | Himilan 1605 | 47.5 | 45 | 50 | 50 |  | 5 |  |
|  | Himilan 1706 | 47.5 | 45 | 50 | 50 |  | 5 |  |
|  | Himilan 1601 |  |  | 45 |  | 50 |  |  |
|  | Himilan 1557 |  |  | 45 |  | 50 |  |  |
|  | Pandex T7298 | 5 | 10 |  |  |  | 90 | 100 |
|  | Art Pearl C-400 |  |  |  |  |  |  |  |
|  | Amine ABT |  |  |  | 3 |  |  |  |
|  | Amine DTH |  |  |  |  |  |  |  |
|  | Polyethylene wax | 0.5 | 0.5 | 0.5 | 0.5 | 0.5 | 0.5 | 0.5 |
|  | Titanium dioxide | 2 | 2 | 2 | 2 | 2 | 2 | 2 |
| Resin physical properties | Gelation | × | × | ○ | ○ | ○ | × | ○ |
|  | MI (g/10 min) | 1.5 | 1.7 | 3.0 | 1.5 | 2.1 | 10.7 | 14.6 |
|  | Specific gravity | 0.98 | 0.99 | 0.97 | 0.98 | 0.97 | 1.14 | 1.19 |
|  | Cover hardness (Shore D) | 62 | 61 | 62 | 63 | 60 | 52 | 45 |
| Ball physical properties | Hardness (mm) | 2.4 | 2.5 | 2.4 | 2.4 | 2.5 | 2.7 | 2.8 |
|  | Weight (g) | 45.1 | 45.2 | 45.0 | 45.1 | 45.0 | 45.0 | 45.5 |
|  | Sand abrasion test | ◎ | ◎ | ○ | ○ | Δ | ◎ | ◎ |
|  | Initial velocity (m/s) | 77.1 | 77.0 | 77.2 | 77.2 | 76.9 | 76.5 | 76.4 |
|  | Durability | 132 | 144 | 130 | 122 | 160 | 300< | 300< |

It is evident from the test results that the cover stock compositions of Examples 1 to 6 do not gel and are thermally stable, as compared with the cover stock compositions of Comparative Examples 1, 2 and 6 which do not contain an organic or inorganic basic compound as an essential component. The cover stock compositions of Examples 1 to 6 are also improved in rebound, durability and paint coat adhesion, as compared with the cover stock compositions of Comparative Examples 1 to 7.

Japanese Patent Application No. 2001-240731 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball material comprising a heated mixture of
   (A) an olefin-unsaturated carboxylic acid copolymer, an olefin-unsaturated carboxylic acid-unsaturated carboxylate copolymer, a metal ion neutralized product thereof, or a mixture thereof,
   (B) a polyurethane elastomer, and
   (C) an organic basic compound that is a tallow alkyl amine, wherein the presence of (C) prevents (A) and (B) from gelling when heated.

2. The golf ball material of claim 1 wherein a weight ratio of components (A):(B):(C) is 50–99.9:0.1–50:0.1–20.

3. The golf ball material of claim 1 wherein a weight ratio of components (A):(B):(C) is 0.1–50:50–99.9:0.1–20.

4. The golf ball material of claim 1 wherein the polyurethane elastomer (B) is a thermoplastic polyurethane elastomer.

5. The golf ball material of claim 1 wherein the polyurethane elastomer (B) is a polyurethane powder.

6. A solid golf ball comprising a solid core and a cover including one or more layers wherein at least one layer of the cover is formed of the golf ball material of claim 1.

* * * * *